Oct. 6, 1959
H. J. OSWALD
2,907,590
PACKED SWIVEL JOINT WITH ANTI-FRICTION
MEANS TO REDUCE PACKING WEAR
Filed Oct. 10, 1955
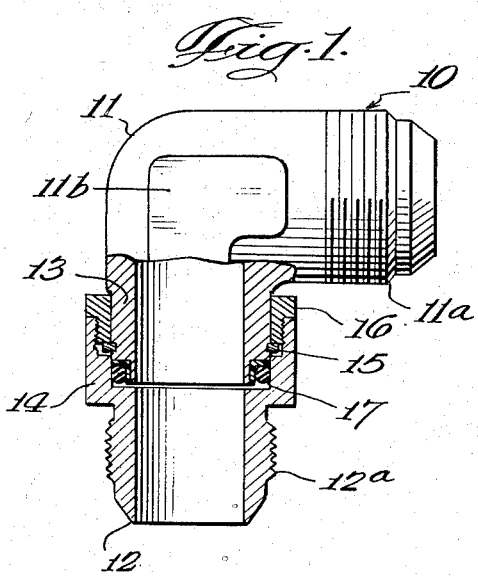
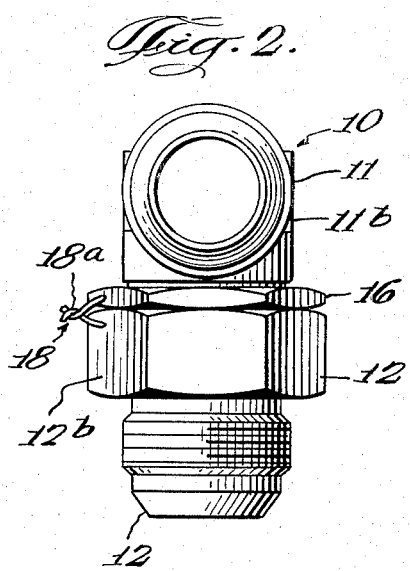
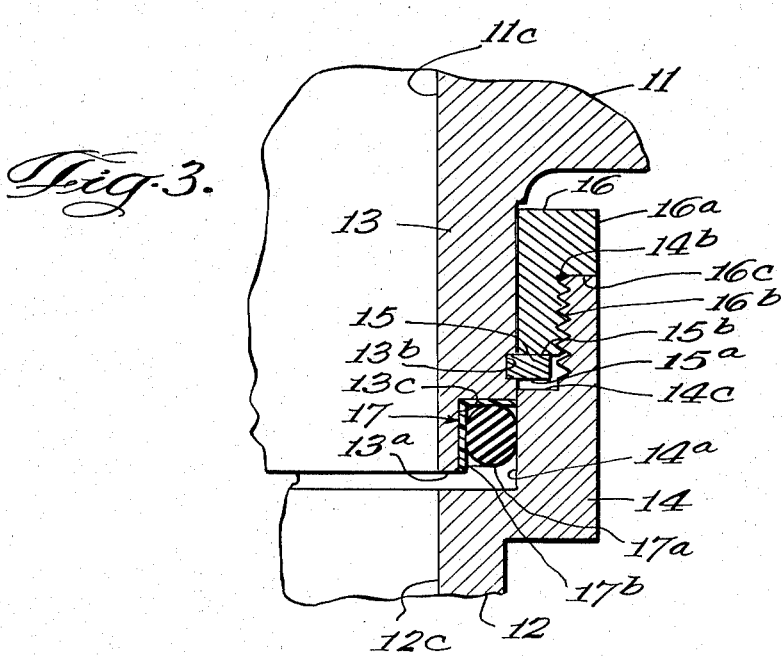
INVENTOR.
Harry J. Oswald
BY
Schroeder, Hofgren, Brady & Wegner
Attorneys United States Patent Office 2,907,590
Patented Oct. 6, 1959

2,907,590

PACKED SWIVEL JOINT WITH ANTI-FRICTION MEANS TO REDUCE PACKING WEAR

Harry J. Oswald, Mokena, Ill., assignor to Francis N. Bard

Application October 10, 1955, Serial No. 539,621

2 Claims. (Cl. 285—98)

This invention relates to a swivel joint and in particular to new and improved means for sealing and maintaining in assembled relationship the sleeve and casing elements of a swivel joint for fluid conduits.

In swivel joints of the type now in the art, a serious disadvantage is found in that the means for sealing the relatively rotatable members and the means for maintaining the assembled relationship of the rotatable members are relatively complicated and consequently costly. Further, installation and removal of such means are often quite difficult, thus hindering efficient maintenance of the joint.

The principal feature of this invention is the provision of new and improved means for sealing and mechanically connecting the relatively movable elements of a swivel joint.

Another feature is the provision of a swivel joint having an annular member threadedly secured to the casing and a retaining ring (preferably a simple snap ring) fixedly secured to the sleeve with outward movement of the casing from the sleeve being limited by abutment of the annular member with the ring.

A further feature of the invention is that the annular member is adapted to be rotated by means such as a tool when desired.

Yet another feature is the provision of means for locking the annular member to the casing when desired.

A still further feature is the provision of readily accessible means on the sleeve for receiving the sealing means, and the arrangement of the casing for coaction with the sleeve to retain the sealing means thereon when the casing and annular member are assembled in threaded relationship.

Other features and advantages of this invention will be apparent from the following description taken in connection with the accompanying drawings wherein:

Fig. 1 is a side elevational view of a joint embodying the invention with a portion thereof shown in diametrical section;

Fig. 2 is an end elevational view of the joint; and

Fig. 3 is an enlarged fragmentary sectional view thereof.

In the exemplary embodiment of the invention as disclosed in the drawings, a swivel joint generally designated 10 is seen to comprise a swing joint having an elbow sleeve 11 and a straight casing 12. One end 13 of sleeve 11 is arranged to be rotatably received within an end 14 of casing 12. For maintaining the sleeve and casing in this assembled relationship, a retaining ring 15 and a suitable ring securing member 16 are provided. Sealing means 17 are provided to seal effectively sleeve 11 to casing 12 while allowing ready rotation therebetween.

While as indicated above, I have illustrated my invention with a joint embodiment having a straight casing and an elbow sleeve, it should be clear to one skilled in the art that the casing could be of the elbow type or the sleeve of the straight type within the inventive concept.

For connecting desired tubular elements or fluid conduits such as loading and unloading lines, means are provided on each of the sleeve and casing. For illustrative purposes only, I show threaded portion 11a on sleeve 11 and threaded portion 12a on casing 12 for this purpose, it being understood that any other suitable connecting means such af flanges may be used. For use in assembling and dissassembling the joint, sleeve 11 is provided exteriorly with tool engaging surfaces 11b and casing 12 is provided exteriorly with a plurality of tool engaging surfaces 12b.

Reference now being had particularly to Fig. 3, a more complete disclosure of the ring 15, securing member 16, and sealing means 17 may be seen. Tubular sleeve 11 is provided with a passage 11c which extends completely therethrough and which opens into an outer end face 13a of sleeve end 13. The cylindrical outer periphery of end 13 is provided at a point spaced from face 13a with an angular slot or groove 13b adapted to receive retaining ring 15. At the outer end of sleeve end 13, opening longitudinally outwardly into end face 13a and radially outwardly from end 13 is a second groove 13c adapted to receive the sealing means 17.

Extending completely through tubular casing 12 is a passage 12c which is diametrically enlarged and stepped in casing end 14 to provide a cylindrical wall surface 14a arranged to be disposed generally radially outwardly of groove 13c when the joint elements are assembled as seen in Fig. 1. A threaded surface 14b is similarly adapted to be spaced generally radially outwardly from the portion of sleeve end 13 having first groove 13b. Extending between surfaces 14a and 14b is a shoulder 14c for limiting longitudinal inward movement of casing 12 by abutment of the shoulder with ring 15.

Retaining ring 15 is preferably a snap ring allowing extremely simple installation in and removal from groove 13b of sleeve 13. The outer diameter of ring 15 is made substantially larger than the diameter of sleeve end 13 so that the radially outer portion of the ring extends substantially from groove 13b and presents an abutting surface 15a facing toward casing shoulder 14c and an abutting surface 15b facing toward securing member 16.

Annular securing member 16 is provided with an internal diameter just slightly greater than the external diameter of sleeve end 13 allowing member 16 to be mounted readily movably thereon. At its longitudinally inner end, member 16 is provided peripherally with a plurality of tool engaging surfaces 16a permitting rotational manipulation independent of the sleeve and casing when desired, or the retention of member 16 while casing 12 is rotated relatively thereto. The longitudinally outer portion of member 16 is threaded at 16b for engagement with the threaded surface 14b of casing end 14. As the external diameter of threaded portion 16b is made substantially less than the inner end of member 16 having surfaces 16a, a shoulder 16c is provided which is adapted to have abutment with casing 14 and limit the outward movement of member 16 as it is threaded into casing end 14.

As it is anticipated that casing end 14 have rotational movement relative to sleeve end 13, sealing means 17 must accommodate this relative movement while effectively sealing these members together. To this end, I provide means 17 comprising two elements, namely, (1) an O-ring 17a of generally conventional construction well known in the art; and (2) a movement-accommodating spacer 17b. Spacer 17b is arranged to space the O-ring 17a from one of the movable members (in the embodiment shown, the O-ring is spaced from the sleeve 13), and limit contact of the O-ring to the other movable member only (in the embodiment shown, contact is limited to the casing 12). Spacer 17b is preferably formed of a material having a low coefficient of friction, such as Teflon (a plastic comprising tetrafluoroethylene polymer). O-ring 17a is preferably formed of rubber having a substantially higher coefficient of friction. The thickness of spacer 17b and the diameter of O-ring 17a are made such as to cause sufficient compression of the O-ring between casing end 14 and the spacer to seal effectively the O-ring to the casing end and to the spacer, and the spacer to the sleeve end 13a. However, because of the different coefficients of friction, the O-ring tends to remain stationary relative to casing end 14 and have sliding engagement only with spacer 17b. Spacer 17b, further, may have sliding movement relative to sleeve end 13a thereby reducing the movement of O-ring 17a relative to the spacer, further minimizing wear of the O-ring. As the groove 13c is extremely accessible being at the outer end of the sleeve 11, replacement of sealing means 17, should that prove necessary, may be simply and quickly effected.

Means 18 for preventing, when desired, relative rotation between casing 12 and securing member 16 may be provided and is herein shown as a pair of wires 18a. One such wire is fixedly secured at one end to member 16 and the other is fixedly secured at one end to casing 12, permitting their free ends to be inter-twisted and thus lock the casing and securing member against relative rotation.

Because of the unique and simple construction of my swivel joint, the snap ring 15 and sealing means 17 may be installed and removed with great ease. In assembling the joint, securing member 16 is first slid over end 13 of the sleeve until the outer end thereof is positioned longitudinally inwardly of groove 13b. Retaining ring 15 is then snapped into the groove. Sealing means 17 is next installed by placing the spacer 17b into groove 13c and pressing O-ring 17a into place outwardly thereof. Where, as seen in Fig. 1, no element has been previously attached to the threaded portion 12a of the casing, threaded engagement of securing member 16 and casing 12 may be effected by holding member 16 stationary and threading casing end 14 thereonto. Should an element be previously connected to the casing precluding its rotation, the casing may be held stationary and member 16 rotated so as to secure these parts together. Threaded advancement of member 16 into the casing is limited by abutment of shoulder 16c of the securing member with the inner end of the casing. To prevent undesired reverse rotation of member 16 relative to the casing, locking wires 18a may be twisted together.

The normal tendency of pressure within such swivel joints is to force the casing and sleeve apart and, thus, the securing member 16 ordinarily will bear against surface 15b of the snap ring. Where forces tending to urge the sleeve and casing together, such as gravity acting on the sleeve, preponderate, the resultant inwardly telescoping movement of the sleeve is limited by abutment of snap ring face 15a with shoulder 14c of the casing. Such longitudinal movement in either the inward or outward direction is readily accommodated by the sealing means as the sliding action between the O-ring and the spacer tends to cause the O-ring to roll against the casing surface 14a rather than slide thereagainst.

Disassembly of the joint is readily accomplished by rotating relatively casing 12 and securing member 16 until the casing is disengaged from the securing member, allowing it to be withdrawn from the sleeve and providing complete and free access to sealing means 17 and the snap ring 15. It should be noted that because of the effectively recessed construction of the sealing means, the snap ring may be removed, when desired, without affecting the sealing means.

While I have shown and described certain embodiments of my invention, it is to be understood that it is capable of many modifications. Changes therefore in the construction and arrangement may be made without departing from the spirit and scope of the invention as defined in the appended claims.

I claim:

1. A swivel joint, of the character described, comprising: a tubular sleeve having a cylindrical end portion terminating in an outer end face and a groove in said end portion opening radially outwardly and longitudinally outwardly into said face; a tubular casing having a cylindrical end portion receiving said sleeve end portion for relative rotation and longitudinal movement therebetween, and having a longitudinally inwardly facing radial shoulder; annular sealing means within said groove including an annular spacer formed of a slippery material and abutting the sleeve in the groove, said spacer having an L-shaped cross section with one leg extending longitudinally and the other leg extending radially relative to the sleeve, and an elastomeric O-ring in the groove abutting at all times said casing and abutting alternatively each of said legs only and said longitudinal leg only, said spacer and O-ring co-operating to seal movably said sleeve to said casing, the coefficient of friction of the spacer with the O-ring being lower than that of the casing with the O-ring, said O-ring having at times movement of translation and/or rotation with respect to said sleeve thereby to have sliding engagement with the spacer and rolling engagement with the casing when relative longitudinal movement between the sleeve and casing occurs to move the spacer longitudinally relative to the casing; annular securing means secured to said casing and extending to adjacent the exterior of said sleeve longitudinally inwardly of said annular sealing means, said securing means defining with the casing an annular space surrounding the sleeve and extending longitudinally inwardly from said casing shoulder, the outer diameter of the securing means being no greater than the outer diameter of the casing; and retaining means removably secured on said sleeve end portion and extending into said space, said retaining means extending longitudinally less than the longitudinal extent of the space to permit limited movement thereof longitudinally in said space and thereby limit the relative longitudinal movement between the casing and the sleeve.

2. A swivel joint as set forth in claim 1 wherein said spacer is formed of Teflon.

References Cited in the file of this patent

UNITED STATES PATENTS

| 2,307,828 | Eggleston | Jan. 12, 1943 |
| 2,420,718 | Odelius | May 20, 1947 |
| 2,481,404 | Donner | Sept. 6, 1949 |
| 2,489,441 | Warren | Nov. 29, 1949 |
| 2,567,527 | Parks | Sept. 11, 1951 |
| 2,600,162 | Franz | June 10, 1952 |
| 2,613,086 | Wolfram | Oct. 7, 1952 |
| 2,632,659 | Lee | Mar. 24, 1953 |
| 2,659,389 | Harvey | Nov. 17, 1953 |
| 2,705,177 | Waring | Mar. 29, 1955 |
| 2,726,104 | Boitnott et al. | Dec. 6, 1955 |
| 2,728,620 | Krueger | Dec. 27, 1955 |

FOREIGN PATENTS

| 1,098,480 | France | Mar. 2, 1955 |